July 2, 1957  H. BECKER  2,797,848
METERING DISPENSER
Filed June 27, 1955  2 Sheets-Sheet 1

INVENTOR.
HENRY BECKER
BY
ATTORNEY

July 2, 1957　　　　　H. BECKER　　　　　2,797,848
METERING DISPENSER

Filed June 27, 1955　　　　　　　　　　　2 Sheets-Sheet 2

INVENTOR.
HENRY BECKER
BY
ATTORNEY

United States Patent Office 2,797,848
Patented July 2, 1957

2,797,848

METERING DISPENSER

Henry Becker, Los Angeles, Calif.

Application June 27, 1955, Serial No. 518,117

11 Claims. (Cl. 222—248)

This invention relates to dispensers and particularly to a dispenser which measures or meters a predetermined amount or quantity of material and is particularly adaptable to the dispensing of confections, such as candy and nuts, and granulated or powdered materials, such as sugar, coffee, and soap.

Hand-operated dispensers are well known. Where prior dispensers have used resilient elements, such as springs, to return the actuating element of the dispenser to normal or closing position, the present invention utilizes a resilient element in the form of a flat spring to measure the amount of material to be dispensed, to close the main hopper, to release the material, and to provide the resiliency necessary to return the actuating element to its normal position. The first movement of the actuating element causes the spring to close the portion of the dispenser, such as a pocket, which has received a predetermined amount of material. Further movement closes the main opening from the hopper of the dispenser and continued movement opens the measuring pocket of the dispenesr to release the measured material. Upon release of the actuating element, the spring returns the actuator to normal position, opening the hopper to the measuring portion thereof and closing this portion. In addition to this action, an agitator unit is actuated during the operation to permit the material to readily flow into the measuring section of the dispenser.

The principal object of the invention, therefore is to facilitate the dispensing of a measured or metered amount or quantity of material.

Another object of the invention is to provide an improved dispenser which utilizes a single element for measuring, closing, releasing, and returning the actuator to normal.

A further object of the invention is to provide a hand-operated dispenser which utilizes a single resilient element to meter material, close the hopper, release the material while the hopper is closed, and return the actuating element of the dispenser to its normal position.

The novel features which are believed to be characteristic of this invention, both as to the manner of its organization and the mode of its operation, will be better understood from the following description when read in conjunction with the accompanying drawings, in which.

Figure 1:
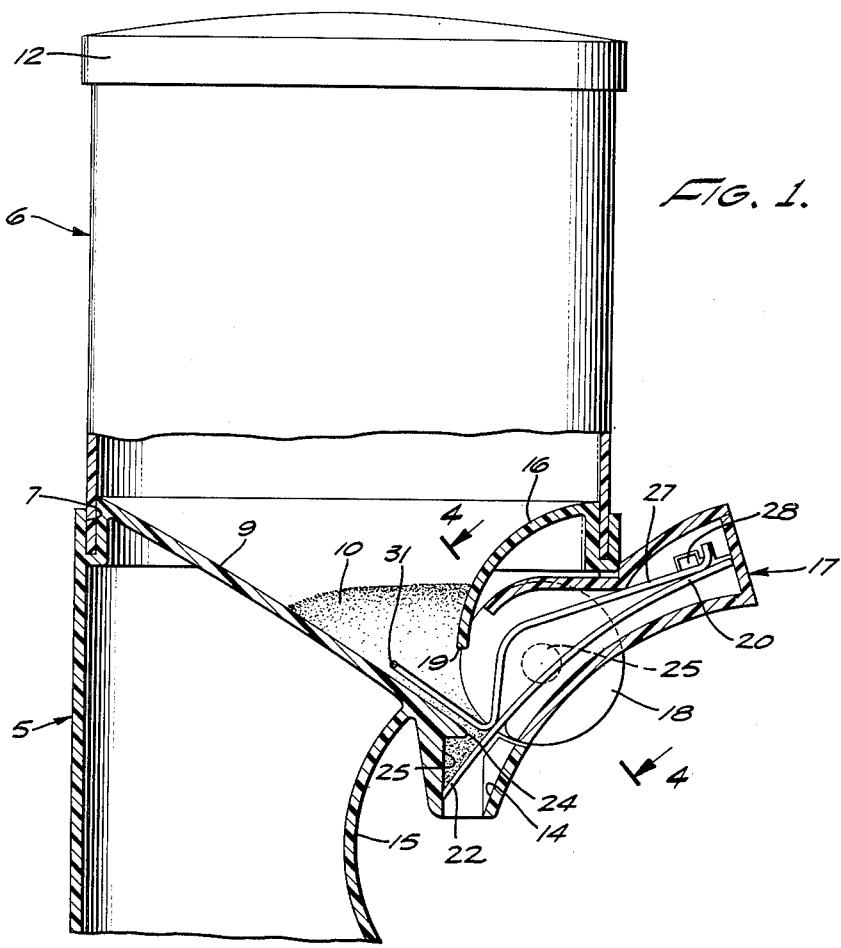
Fig. 1 is an elevational view, partly in cross section, embodying the invention.

Referring to the drawings, in which the same numerals identify like elements, a dispensing container includes a lower section 5 and an upper hopper section 6 fitted into an annular recess 7 at the top of the lower section 5. These units may be cylindrical or of other suitable shapes. The lower section 5 has a sloping upper wall 9 in which material 10, such as nuts, candy, sugar, coffee, soap powders, and the like, may be contained. This material may be inserted in the upper section 6 upon the removal of a cover 12. The sloping wall 9 has an exit conduit 14 formed in the lower portion thereof which is in a recess formed by a curved wall 15 of the section 5. A curved wall 16 forms an opening 19 between its lower edge and the wall 9.

A hand-operated lever or actuator 17 is adapted to rotate or pivot on a cylinder 18 having stub shafts 23 and 25 and mounted on the lower section 5. The actuator 17 contains a flat spring 20 which passes through the cylinder 18 and has one end 22 in contact with the left hand wall of conduit 14. In this normal position of spring 20, it is separated from the point 24 of the wall 9 so that the material 10 may flow from the main hopper through the opening between points 19 and wall 9 and between the spring and point 24 into the measuring pocket 25.

A wire loop agitator 27 having one end connected behind a stop 28, along with one end of spring 20, extends through the cylinder 18 and rests against the upper surface of the spring 20 near its end 22. The loop 31 of the agitator extends into the material 10.

Figure 2:
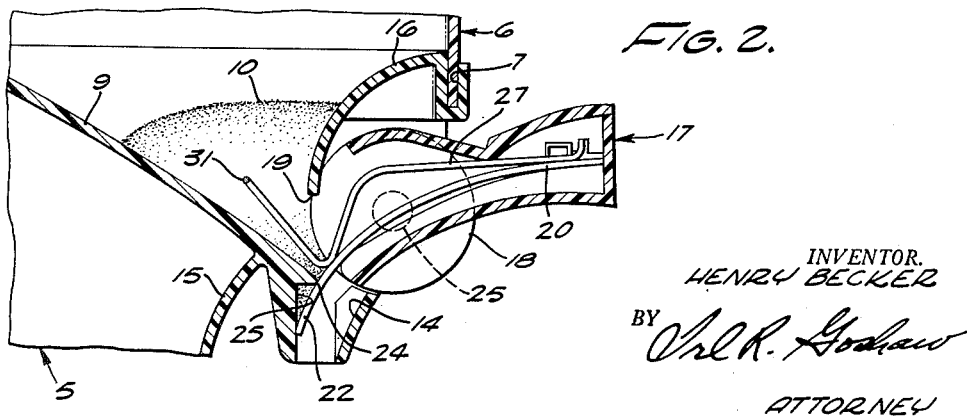
Fig. 2 is a detailed cross sectional view showing another position of the dispensing elements of the invention shown in Fig. 1.

The operation of the dispenser is that after a certain movement of the lever 17 downwardly as shown in Fig. 2, the lower end portion of the spring 20 moves upwardly and to the left to close the space between it and point 24 to secure a certain amount or quantity of material in pocket 25, while the agitator end 31 moves upwardly to agitate the material. As the right hand end of the lever 17 continues its downward movement to the position shown in Fig. 3, the lower end of the spring 20 allows the material in the pocket 25 to escape or be released through the conduit 14, and the higher portion of the spring closes the opening between the point 19 and the wall 16 and the point 24 of the wall 9. Thus, as the material escapes through conduit 14, the material 10 in the hopper is prevented from passing into conduit 14.

Figure 3:
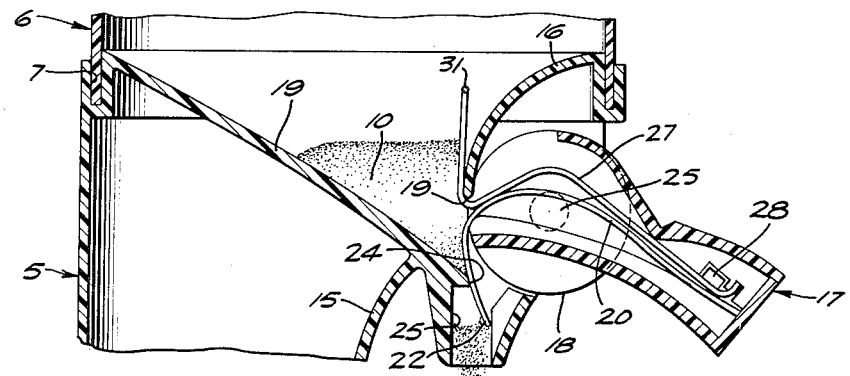
Fig. 3 is a detailed cross sectional view showing the actuating elements in a third position.
Figure 4:
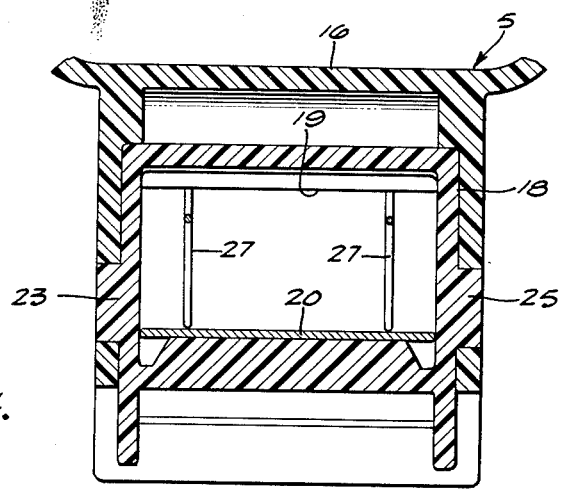
Fig. 4 is a cross sectional view taken along the line 4—4 of Fig. 1.
Figure 5:
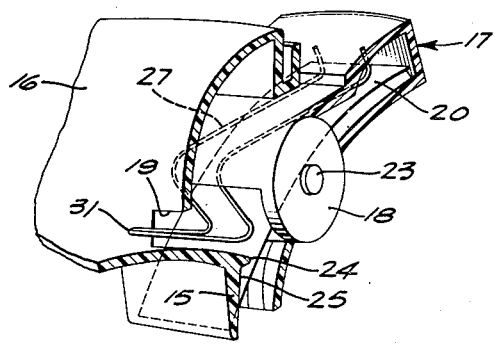
Fig. 5 is a prospective view of the dispensing elements embodying the invention.

The spring in the position shown in Fig. 3 is under tension so that upon the release of pressure on the right hand end of actuator 17, the lever and spring and actuator will return to the position shown in Fig. 1. In this condition, material 10 will flow into the measuring pocket 25 while the agitator 31 will prevent any jamming and packing of the material. There is thus provided a hand-operated dispenser which uses a single resilient element to measure a certain amount of material, release the material, while closing the main hopper and to provide the restoring action for the actuating dispenser lever. By having the lower end of the spring slide over the edge 24 for a short distance, a cleaning action of the spring is obtained.

I claim:

1. A dispenser comprising a hopper adapted to hold material to be dispensed, said hopper having an opening for the discharge of said material, a pivotable lever adjacent said opening and adapted to be rotated and a resilient element contained within said lever, said resilient element and the walls of said hopper at said discharge opening preventing the discharge of said material when said lever is in normal position, manual movement of said lever causing said resilient element to release a predetermined amount of said material and close said discharge opening in said hopper, said lever being restored to its normal position by said resilient element.

2. A dispenser in accordance with claim 1 in which said hopper walls at said discharge opening and said resilient element form a measuring pocket.

3. A dispenser in accordance with claim 2 in which said resilient element is a flat spring.

4. A dispenser in accordance with claim 3 in which an agitator in said lever extends into said hopper and is actuated when said lever is actuated.

5. A hand-operated dispenser comprising a hopper adapted to hold material to be dispensed in predetermined equal amounts, a conduit extending from said hopper forming an exit for said material in said hopper, an opening from said hopper communicating with said conduit, a lever mounted on said hopper adjacent said opening, and a spring within said lever and extending into said conduit, said spring and the wall of said conduit forming a pocket in said conduit for said material when said lever and spring are in normal position, manual movement of said lever and spring causing said spring to close said opening and to release the amount of said material in said pocket.

6. A hand-operated dispenser in accordance with claim 5 in which a rotatable lever is mounted on said hopper adjacent said opening, said lever being mounted on said cylinder, said spring extending from one end of said lever through said cylinder and having one end abutting a wall of said conduit to form said pocket in said conduit.

7. A hand-operated dispenser in accordance with claim 6 in which said spring is flat and is adapted to be tensioned by rotation of said lever, said spring having its pocket-forming end removed from the wall of said conduit as another portion thereof closes said opening.

8. A hand-operated dispenser in accordance with claim 7 in which a wire looped agitator extends from one end of said lever, through said cylinder and opening and into said hopper.

9. A dispenser comprising a hopper adapted to hold material to be dispensed therefrom in predetermined amounts, said hopper having an opening therein, a manually operable lever pivoted adjacent said opening, a conduit extending from said opening through which material in said hopper is dispensed, and a flat spring within said lever and having one end abutting a wall of said conduit below said opening to form a pocket, said spring preventing the dispensing of material from said hopper when said lever is in normal position, manual movement of said lever bending said spring to remove its one end from said conduit wall and to move another portion thereof across said opening permitting the material between said spring, conduit wall and opening to be dispensed through said conduit.

10. A dispenser in accordance with claim 9 in which the resiliency of said spring returns said lever to its normal position when manually released.

11. A dispenser in accordance with claim 10 in which an agitator is provided within said lever and extends through said opening into said hopper.

References Cited in the file of this patent
UNITED STATES PATENTS

| | | |
|---|---|---|
| 939,066 | McCreery | Nov. 2, 1909 |
| 1,472,112 | Barrows | Oct. 30, 1923 |
| 1,648,481 | Hollenback | Nov. 8, 1927 |
| 2,387,923 | McBrien | Oct. 30, 1945 |
| 2,559,522 | Sparacio | July 3, 1951 |
| 2,696,935 | Obeck | Dec. 14, 1954 |